(No Model.)
J. FOREMAN.
Churn.
No. 229,597.
Patented July 6, 1880.
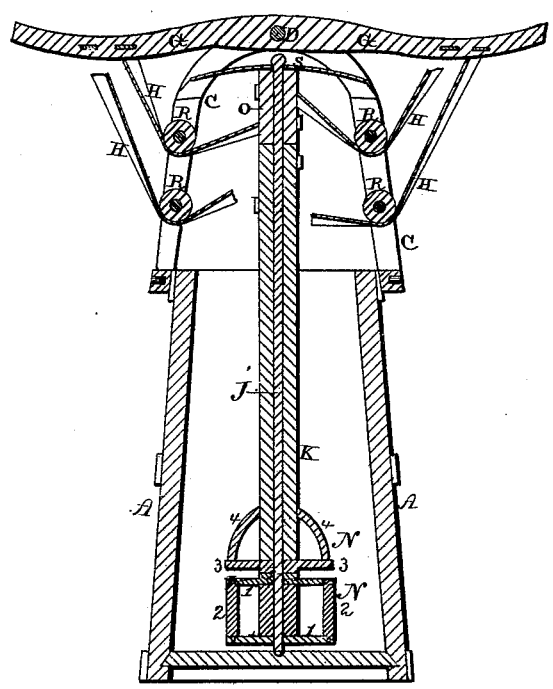
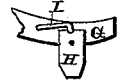
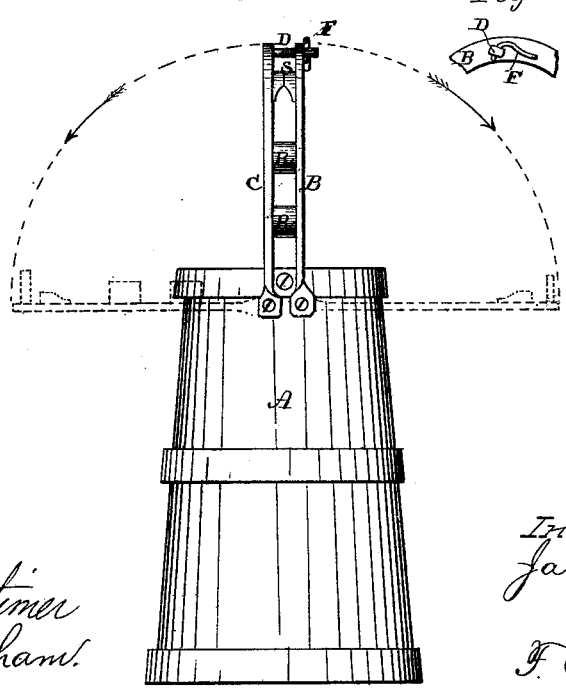
Witnesses
W. W. Mortimer
Chas. H. Isham
Inventor
Jacob Foreman,
per
F. A. Lehmann
Atty.

UNITED STATES PATENT OFFICE.

JACOB FOREMAN, OF OHIO TOWNSHIP, MADISON COUNTY, IOWA.

CHURN.

SPECIFICATION forming part of Letters Patent No. 229,597, dated July 6, 1880.

Application filed April 17, 1880. (No model.)

*To all whom it may concern:*

Be it known that I, JACOB FOREMAN, of Ohio township, in the county of Madison and State of Iowa, have invented certain new and useful Improvements in Churns; and I do hereby declare the following to be a full, clear, and exact description of the invention, such as will enable others skilled in the art to which it pertains to make and use it, reference being had to the accompanying drawings, which form part of this specification.

My invention relates to an improvement in vibrating churns; and it consists in making the frame in which the operating-lever is pivoted in two separate parts, which parts are hinged at their lower ends to the top of the churn, and can be opened outward for the purpose of removing the dasher.

It further consists in the combination of four separate and independent straps, which are connected together at their outer ends to the same operating-lever, and which have their lower ends connected to a central and an outer dasher-rod, whereby two dashers are operated in opposite directions at the same time, as will be more fully described hereinafter.

Figure 1 is a vertical section of my invention. Fig. 2 is a side elevation of the same, showing the frame open. Figs. 3 and 4 are detail views.

A represents a suitable churn, which has the frame for the operating mechanism secured to its top edge upon opposite sides. This frame is made in two separate and independent parts, B C, each one of which can be turned upon its pivots to separate them when it is desired to remove or replace the dasher and its operating mechanism.

The pin or stud D, through which the hook F passes for the purpose of locking the two parts of the frame together, also forms the pivot upon which the operating-lever G is placed. To this lever are fastened the four operating-straps H, which have their outer ends passed through holes in the lever, and which are caught and held by means of the hooks I. Should the straps become loose and stretched at any time, it is only necessary to loosen the hook, draw the strap up more tightly, and then press the hook through the strap at another point. This adjustment is very necessary, as the strap expands and contracts to a considerable extent, owing to the amount of moisture in the atmosphere.

There are two dasher-rods used, the one J passing down through a hollow outer one, K, and each of these rods has a dasher, N, secured to it. The inner dasher-rod has a round block or enlargement, O, secured to its outer end, for the purpose of attaching the inner ends of the two upper straps to it; and as the straps are fastened to the two rods in opposite directions, when the lever is worked up and down the two dashers will revolve in opposite directions.

To one of the parts of the frame are secured the four rollers R, which guide the straps so as to cause them to act directly upon the dasher-rods, and to each one of the two parts of the frame are secured suitable bearings S, which hold the upper end of the central dasher-rod between them, so as to keep the dasher-rod always in a vertical position.

The lower dasher consists of the two horizontal arms 1, which have their outer ends connected together by means of the vertical rods 2, while the upper dasher consists of the single horizontal arm 3 and the two curved rods 4, which have their upper ends secured directly to the sides of the dasher-rod.

When it is desired to remove the dashers from the churn the two parts of the frame are opened outward, the lever is removed from its pivot, and then the double dasher, the connecting-straps, and the lever are all taken out together.

Having thus described my invention, I claim—

1. The combination of the churn A and operating-frame, made in two parts, and which parts can be opened outward for the purpose of removing the operating-lever and the double dasher, substantially as shown.

2. The combination of the operating-lever provided with holes with the operating-straps, which have their ends passed through the holes in the lever and secured therein by means of suitable hooks or other fastening devices, substantially as described.

3. The combination of the supporting-frame provided with a guiding-roller for each strap, the operating-lever having the outer ends of the straps secured thereto, and two dasher-rods which are made to revolve in opposite directions, substantially as set forth.

In testimony that I claim the foregoing I have hereunto set my hand this 31st day of March, 1880.

JACOB FOREMAN.

Witnesses:
JOHN H. FOREMAN,
HENRY × BONNEY,
his mark.
CHAS. H. ISHAM.